R. RUEMELIN
SAND BLAST CURTAIN
Aug. 30, 1932.
Re. 18,586
Original Filed May 16, 1924
2 Sheets-Sheet 1
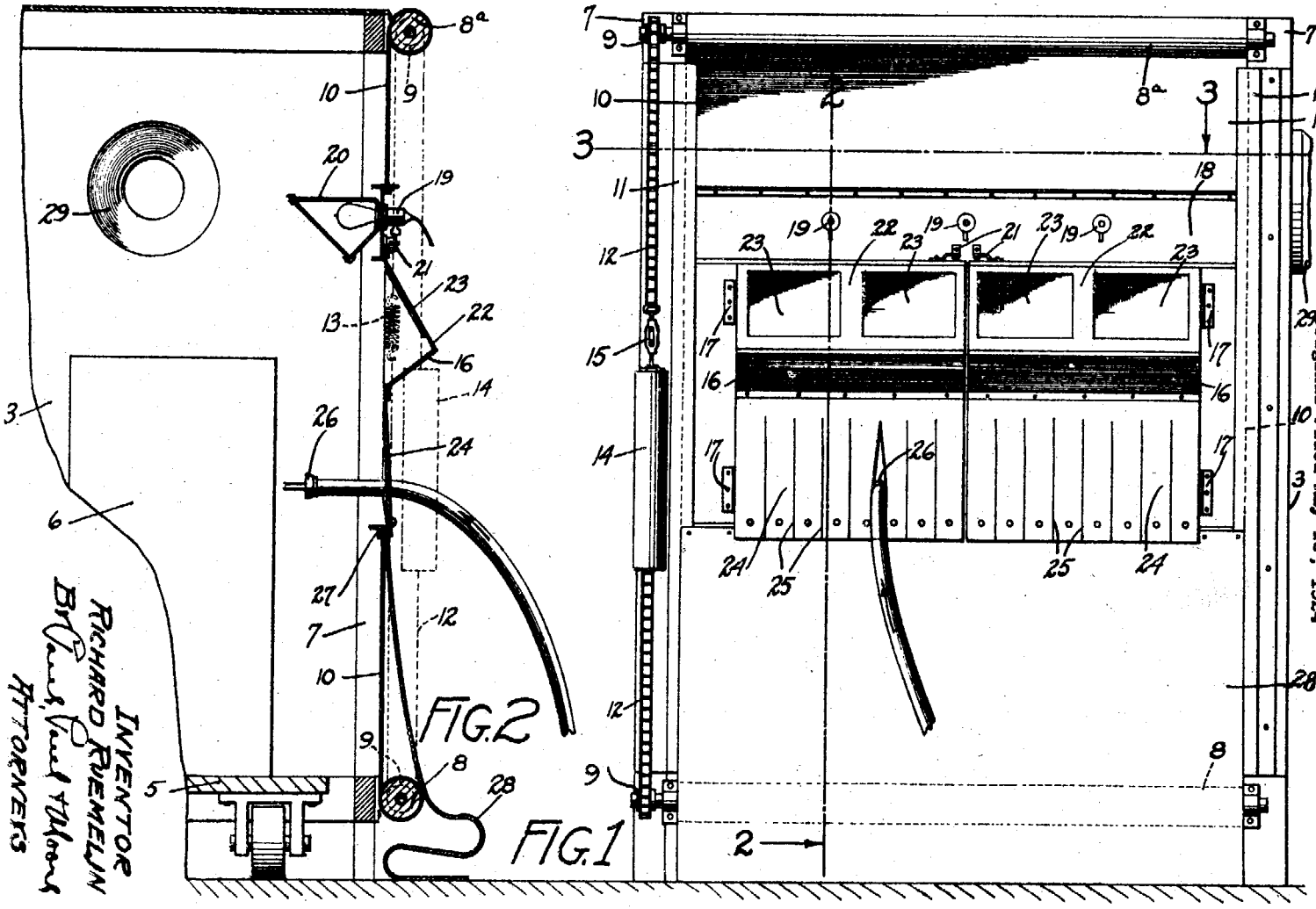

Aug. 30, 1932.

R. RUEMELIN

SAND BLAST CURTAIN

Original Filed May 16, 1924

Re. 18,586

2 Sheets-Sheet 2

INVENTOR
RICHARD RUEMELIN
BY Paul, Paul & Moore
ATTORNEYS

Reissued Aug. 30, 1932 Re. 18,586

UNITED STATES PATENT OFFICE

RICHARD RUEMELIN, OF MILWAUKEE, WISCONSIN

SAND BLAST CURTAIN

Original No. 1,676,576, dated July 10, 1928, Serial No. 713,801, filed May 16, 1924. Application for reissue filed May 16, 1932. Serial No. 611,737.

In the operation of applying a sand blast to the face of a monument or other stone or article for letter or design cutting or other purposes, it is customary to mount the stone or other article upon a suitable carriage which is moved upon a track into a cabinet, the operator standing outside the cabinet and applying the sand blast through the wall thereof against the face of the work. Instead of using a carriage, the stone or other work may be handled by a crane. In stone work, it is essential that the sand blast nozzle be held in a position substantially at right angles to the face of the stone to which the sand is applied, otherwise the sand will get between the face of the stone and the glue or other protective coating thereon and damage the stone. The nozzle in the course of the work is held at different elevations and the object of my invention is to provide an adjustably mounted curtain through which the nozzle may be projected, the curtain being provided with means whereby the nozzle may be moved both vertically and horizontally over the face of the stone. Provision is also made so that the operator can follow the work through a suitable screened peephole as the changes in the position of the nozzle are made. For other work such as cutting the face of castings the curtain allows the nozzle to be held at any desired angle.

Other objects of the invention will appear from the following detailed description.

The invention consists generally in various constructions and combinations all as hereinafter described and particularly pointed out in the claims.

In the accompanying drawings forming part of this specification,

Figure 1 is a front elevation of a cabinet with my invention applied thereto;

Figure 2 is a vertical sectional view of the same;

In the drawings:

Figure 3:
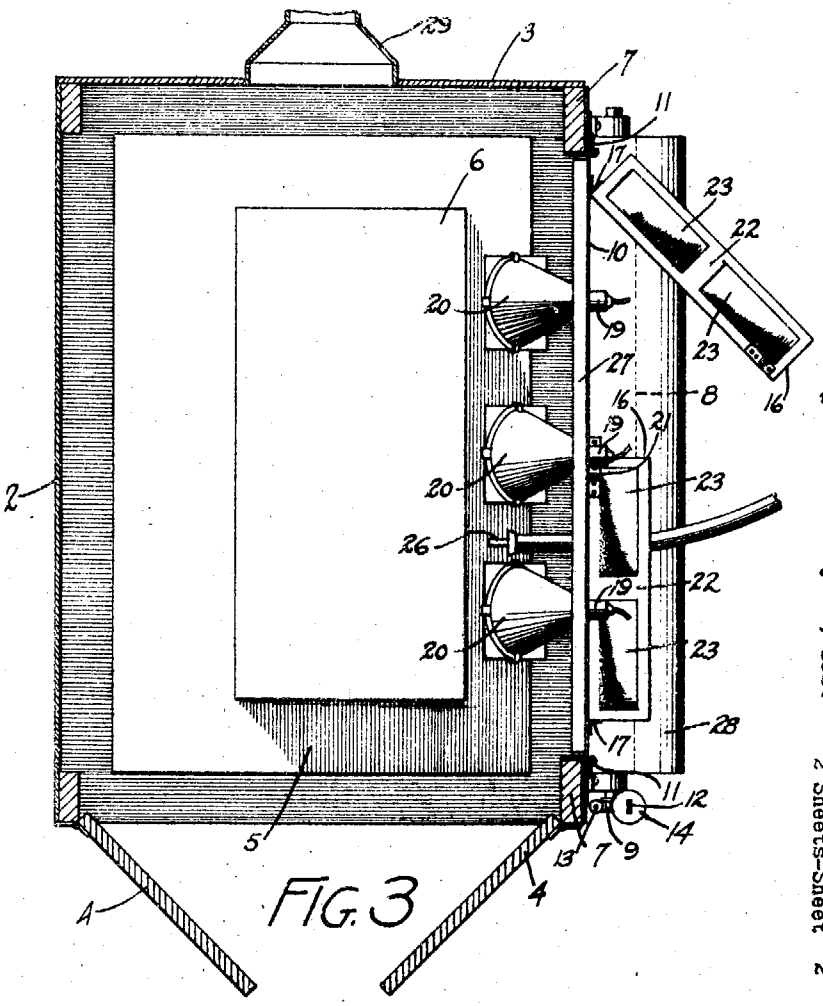
Figure 3 is a horizontal sectional view on the line 3—3 of Figure 1.

2 represents the rear wall of the cabinet. 3 one of the end walls; the opposite end wall having doors 4 therein adapted to open and allow a suitable truck 5 to be run into the cabinet, the monument or other stone 6 being supported upon this truck in position for cutting the letters or figures in the face of the stone.

Instead of having doors in the side wall of the cabinet to allow a truck to be moved in and out, the work may be handled by a crane and in that case the top of the cabinet may be open or made removable. This, however, is such an obvious modification that its illustration is unnecessary.

The front of the cabinet is provided with upright rails or posts 7 on each side of an opening extending across the cabinet. Below the opening, I mount a roller 8 and above the opening at the top of the cabinet a similar roller $8^a$ is mounted. These rollers are provided with sprocket wheels 9. A curtain 10 of rubber or any other suitable material is stretched between the rollers and connected thereto and is adapted to slide vertically in the open front of the cabinet with its edges between the rails 7 and guides 11 secured to said rails. A sprocket chain 12 connects the wheels 9 and has a tension spring 13 between its ends and a counterweight 14 is mounted in said sprocket chain and provided with a turnbuckle 15 by means of which the sprocket chain may be made slack or taut as desired by increasing or decreasing the tension on the spring 13. The counter-weight has the function of balancing the weight of the curtain and the doors thereon to enable the operator to more easily raise and lower the curtain in the operation of the sand blast. Doors 16 are hinged at 17 at the sides of the curtain and are adapted to open up and expose an opening in the curtain and the interior of the cabinet.

Above the doors 16 is a panel 18, preferably of sheet-metal, to which the upper portion of the curtains is secured by suitable means. This panel preferably supports a series of lights 19 having reflectors 20 on the inner side of the panel arranged to deflect the rays of light downwardly upon the surface of the stone or other article that is being cut. The lights are connected with some suitable source of electrical energy, not shown. Latch members 21 are mounted on the doors 16 and the panel 18 for holding and supporting the doors in their closed position.

In the upper part of the doors 16 are panels 22 having screened openings 23 through which the operator may observe the face of the work, looking down from above at a suitable angle to the work and near the lamps arranged to throw the rays directly on the work surface, the operator being thereby enabled to closely follow the letter or design-cutting operation. Suspended below the observation openings is an apron 24 having a series of vertical slits 25 therein through which the sand blast nozzle 26 may be inserted, the material composing the apron, opening up sufficiently where the slits are formed therein to allow freedom of insertion of the nozzle into the cabinet. This nozzle in stone work is held by the operator in a substantially horizontal position as indicated in Figure 2 so that the sand blast is directed upon the face of the stone in a direction at right angles substantially thereto and in forming the letters, figures, or other design, the operator will raise or lower the nozzle to keep it always in stone work as near as possible to a right angle position with the surface on which it is working, the purpose of this being to prevent the blast from disturbing the surfacing of the stone and marring or damaging any portion thereof that is not to be cut by the sand blast. In other work, such as cutting castings and the like, the nozzle may be held at any desired angle to obtain the best results and the apron will permit the movement of the nozzle to such angle, the operator having at all times a clear vision of the interior of the cabinet and the surface of the work.

An angle bar 27 is preferably provided at the point where the lower edge of the apron meets the curtain section and this angle bar serves to stiffen the curtain and forms a hand grip to enable the operator to raise or lower the curtain and adjust the nozzle to the desired position on the stone or the point where the operator wishes to cut the letter or other character. The counterbalance serves as a means for aiding the vertical movement of the curtain, balancing the weight of the doors and the apparatus connected therewith and allowing the operator to easily and quickly position the slots in the apron and the nozzle opposite the surface in which the cutting is to be done. With this vertically movable curtain, and by means of the slitted apron 24, the operator can work on the face of the stone from the top to the bottom and from side to side thereof and always have the nozzle at right angles to the plane of the work surface, and can also hold the nozzle at any other desired angle for other work.

The observation openings will of course follow the adjustment of the curtain and enable the operator to keep in very close touch with his work and follow exactly the pattern marked on the stone.

I prefer also to provide a loose flap 28 attached to the curtain below the door and depending loosely outside the lower roll for the purpose of preventing sand or other foreign material from getting between the surface of the roll and the curtain.

Figure 4:
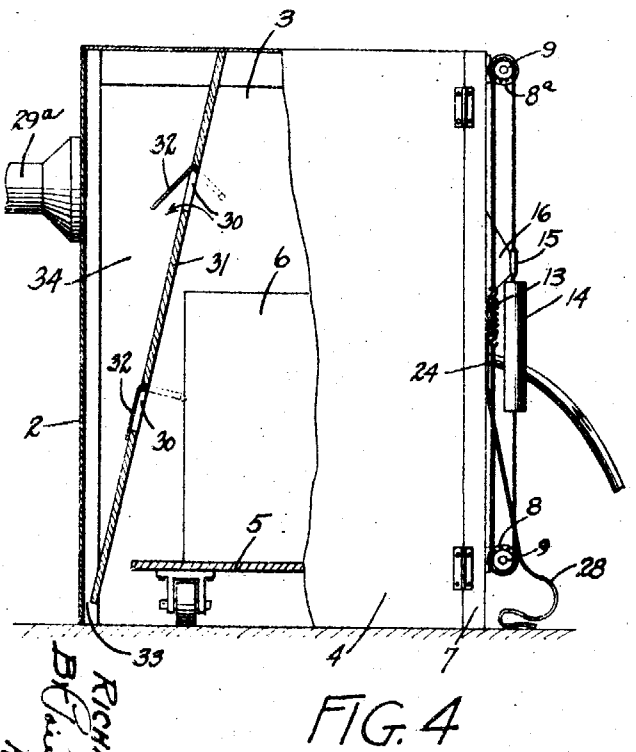
Figure 4 is a view partially in section showing a cabinet of modified construction, having means for preventing the sand from being drawn into the suction trunk leading from the cabinet.

The wall 3 of the cabinet has a trunk connection 29 communicating with a suitable suction device by means of which the air in the cabinet, laden with sand and dust, may be drawn from the cabinet. In Figure 4, there is shown a modified construction, wherein an inclined partition 31 is arranged within the cabinet for the purpose of preventing the sand from being drawn from the cabinet into the suction trunk 29[a], provided in the rear wall 2 of the cabinet. Openings 30 are provided in the partition 31 through which the sand and dust laden air is drawn by the suction means from the main portion of the cabinet. Valves or dampers 32 are provided to control the flow of air through the opening 30. When the valves 32 are opened they will assume an inclined position which will cause the sand drawn through the openings to be downwardly directed into the bottom of the cabinet. The partition is preferably suspended, as shown in Figure 4, being inclined toward the side wall as shown with a gap 33 provided between its lower end and the wall of the cabinet through which gap the heavier particles precipitated as the air flows across the chamber 34 will be directed into the bottom of the cabinet.

In the operation of the device, for cutting the face of stone, the operator will thrust the sand blast nozzle through one of the slits 25, and supporting the nozzle at the desired elevation will direct the sand blast upon the face of the stone in a direction substantially at right angles thereto. If the work is on the lower portion of the stone, the curtain will be adjusted so that the nozzle will be opposite this portion. On the other hand, if the work is at the top of the stone, then the curtain will be raised to the desired elevation, the observation openings following the adjustment of the curtain and enabling the workman to maintain a very close observation of the letter or character-cutting work.

The curtain 10 serves as a panel to shield the face of the operator from particles of sand rebounding from the surface of the work against which the blast of sand is projected so that the operator is better enabled to observe the progress of the work at the different elevations at which the sand blast is acting, as well as serving to confine the sand blast to the space back of the panel from which it is recovered for further use if desired.

I claim as my invention:

1. The combination with a cabinet adapted to contain the article to be cut, of a panel mounted for adjustment and having openings through which a sand blast nozzle may be inserted and held at an angle to the plane of the work surface as the work thereon progresses, said panel having observation openings through which the work and nozzle may be viewed in each adjusted position.

2. The combination with a cabinet adapted to contain a block of stone having a surface to receive a sand blast, of rollers mounted in the top and bottom of said cabinet, a curtain connecting said rollers and normally closing an opening in the cabinet, means for operating said rollers to wind the curtain thereon, said curtain having openings therein through which a sand blast nozzle may be inserted and held at an angle to the face of the stone at any desired elevation thereon.

3. The combination with a cabinet adapted to contain an article having a face to receive a sand blast, of a curtain mounted for movement in a plane parallel substantially to the face of the article, doors mounted on said curtain and adapted to open and expose the interior of the cabinet and the article, said doors being movable with the curtain and having observation openings and means through which a sand blast nozzle may be inserted and held opposite the face of the stone at any desired elevation thereon.

4. The combination with a cabinet adapted to contain an article having a face to receive a sand blast, of a door mounted for adjustment opposite the face of the work and adapted to open and expose the work, said door having means through which a nozzle may be inserted for directing a sand blast upon the work at any angle thereto.

5. The combination with a cabinet adapted to contain an article having a face to receive a sand blast, of means mounted for adjustment opposite the work and including an apron having slits therein through which a sand blast nozzle may be inserted.

6. The combination with a suitable cabinet for the work, of a member mounted for adjustment opposite the face of the work, and adapted to be moved to expose the work, said member having means through which a sand blast nozzle may be inserted, and an observation window.

7. The combination with a suitable support for the work, of a curtain mounted for adjustment opposite the work, a door in said curtain adapted to be opened to expose the work, said door having an apron through which a sand blast nozzle may be inserted.

8. The combination with a support for the work, of oppositely arranged rollers, a suitable curtain connecting said rollers and positioned opposite the work, said curtain being adapted to be wound on said rollers and having means through which a sand blast nozzle may be inserted, for the purpose specified.

9. The combination with a cabinet adapted to contain the article to be cut, of a panel mounted for adjustment and having openings through which a sand blast nozzle may be inserted and held at an angle to the plane of the work surface as the work thereon progresses, said panel having observation openings through which the work and nozzle may be viewed in each adjusted position, and also having a light positioned to illuminate the portion of the work being operated upon in such manner as to permit the illuminated portion to be observed through the observation opening in each adjusted position of the observation opening and nozzle.

10. The combination with a cabinet adapted to contain the article to be cut, of a panel mounted for adjustable movement, said panel having a series of openings through which a sand blast nozzle may be selectively inserted and held at an angle to the plane of the work surface as the work thereon progresses, said series of openings extending transversely of the direction of movement of the panel and being movable therewith, and said panel also having observation means movable therewith and extending longitudinally of the series of nozzle openings through which the work and nozzle may be viewed in each adjusted position.

11. The combination with a cabinet adapted to contain the article to be cut, of a panel mounted for vertical adjustable movement, said panel having a series of openings through which a sand blast nozzle may be selectively inserted and held at an angle to the plane of the work surface as the work thereon progresses, said series of openings extending horizontally and being movable with the panel, and said panel also having observation means movable therewith and extending parallel to the series of nozzle openings through which the work and nozzle may be viewed in each adjusted position.

12. The combination with a cabinet adapted to contain an article having a face to receive a sand blast, of means mounted for vertical adjustment opposite the work and including a curtain and a series of slits through which a sand blast nozzle may be selectively inserted, the series extending transversely of the direction of movement of the curtain and being movable therewith.

13. The combination with a support for the work of oppositely arranged upper and lower vertically spaced rollers, a suitable curtain connecting said rollers and positioned opposite the work, said curtain being adapted to be wound on said rollers and having means through which a sand blast nozzle may be inserted for the purpose specified.

14. The combination with a support for the work of oppositely arranged upper and lower vertically spaced horizontal rollers, a suitable curtain connecting said rollers and positioned opposite the work, said curtain being adapted to be wound on said rollers and having means through which a sand blast nozzle may be inserted for the purpose specified, and also having observation means adjacent said nozzle receiving means.

15. The combination with a cabinet adapted to contain the article to be cut, of a panel mounted for adjustable movement and having means through which a sand blast nozzle may be inserted and held at an angle to the plane of the work surface as the work thereon progresses, the said nozzle receiving means extending transversely of the direction of movement of the panel and being movable therewith, said panel having observation means adjacent said nozzle receiving means and movable therewith through which the work and nozzle may be viewed in each adjusted position, and said panel also having a light mounted thereon adjacent the observation means for movement therewith, and positioned to illuminate the portion of the work being operated upon in such a manner as to permit the illuminated portion to be observed through the observation opening in each adjusted position of the observation opening and nozzle.

16. The combination with a cabinet adapted to contain the article to be cut, of a panel having a horizontally extending series of openings through which a sand blast nozzle may be selectively inserted and held at an angle to the plane of the work surface as the work thereon progresses, said panel also having observation opening means extending longitudinally of the series of openings, sheets of flexible material attached to the upper and lower edges of said panel, and upper and lower rollers to which said sheets of flexible material are secured, one of said rollers being rotatable to cause rolling of the flexible material thereon and movement of the panel to vary the vertical position of the nozzle openings and observation opening means.

17. The combination with a cabinet adapted to contain the article to be cut, of a panel having a horizontally extending series of openings through which a sand blast nozzle may be selectively inserted and held at an angle to the plane of the work surface as the work thereon progresses, said panel also having observation opening means extending longitudinally of the series of openings, sheets of flexible material attached to the upper and lower edges of said panel, upper and lower rollers to which said sheets of flexible material are secured, said rollers being rotatable to cause rolling of the flexible material thereon and movement of the panel to vary the vertical position of the nozzle openings and observation opening means, transmission means connecting said two rollers, and counterbalancing means cooperating with said transmission means for maintaining the panel in a desired position of adjustment.

18. The combination with a support for the work of upper and lower vertically spaced rollers, a curtain sheet connecting said rollers and positioned opposite the work, said certain sheet having means movable therewith through which a sand blast nozzle may be inserted and also having transparent observation means movable therewith, means independent of the curtain sheet for causing the rollers to rotate simultaneously when the curtain sheet is being raised or lowered, and means for automatically maintaining the curtain sheet in desired position after an adjustment has been effected.

19. The combination with a support for the work of upper and lower vertically spaced rollers, a curtain sheet connecting said rollers and positioned opposite the work, said curtain sheet having means movable therewith through which a sand blast nozzle may be inserted and also having transparent observation means movable therewith, means independent of the curtain sheet for causing the rollers to rotate simultaneously when the curtain sheet is being raised or lowered, and counter-balancing means for automatically maintaining the curtain sheet in desired position after an adjustment has been effected.

20. The combination with a support for the work of upper and lower vertically spaced rollers, a curtain sheet connecting said rollers and positioned opposite the work, said curtain sheet having means movable therewith through which a sand blast nozzle may be inserted and also having transparent observation means movable therewith, means independent of the curtain sheet for causing the rollers to rotate simultaneously when the curtain sheet is being raised or lowered, counter-balancing means for automatically maintaining the curtain sheet in desired position after an adjustment has been effected, and a light positioned to illuminate the portion of the work being operated upon in such a manner as to permit the illuminated portion to be observed through the observation opening in each adjusted position of the observation opening and nozzle.

In testimony whereof I affix my signature.

RICHARD RUEMELIN.